Figure 1:
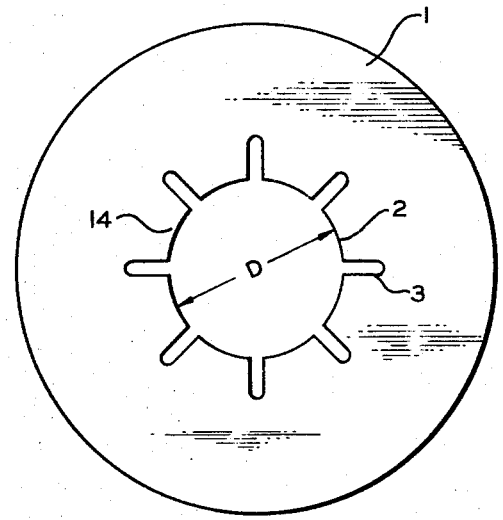

Sept. 27, 1966          B. G. FRANKS          3,275,390

RETAINER RING AND WASHER FOR TRACTOR-TRAILER WITH FIFTH WHEEL

Filed Sept. 1, 1964

INVENTOR.
BOBBY G. FRANKS

BY

ATTORNEYS

United States Patent Office 3,275,390
Patented Sept. 27, 1966

3,275,390
RETAINER RING AND WASHER FOR TRACTOR-TRAILER WITH FIFTH WHEEL
Bobby G. Franks, Bartlesville, Okla., assignor to Phillips Petroleum Company, a corporation of Delaware
Filed Sept. 1, 1964, Ser. No. 393,584
3 Claims. (Cl. 308—136)

This invention relates to couplings for trucks and trailers. In one of its aspects, it relates to the use of a self-lubricating washer in combination with a self-locking retaining ring to provide for lubrication between the power-driven truck and the attached trailer. In another of its aspects, it relates to the use of a retaining ring to maintain a self-lubricating washer in a fixed relationship on a trailer kingpin during the loading of a trailer onto a truck using a fifth wheel connection. In a more specific aspect, the retaining ring fits into a recess in the self-lubricating washer.

The fifth wheel assembly is a standard connection for a truck and trailer whereby the truck is used as a power unit and the trailer can be connected or disconnected at will. The connection provides for relative rotating movement between the truck and trailer. Such a connection requires lubrication for maximum efficiency of operation of the truck and trailer assembly. It has been proposed to provide a lubricating washer directly on the fifth wheel between the truck and trailer assembly. One method of connecting the trailer to the truck with the lubricating washer in between the two is to hold the lubricating washer on the trailer kingpin while the kingpin is inserted in the fifth wheel slot. Heretofore, two men have been required to hold the lubricating washer on the kingpin while attaching the trailer to the truck. This practice is costly as well as dangerous.

It is now proposed to provide a self-locking washer which will maintain the lubricating washer in fixed relationship on the trailer kingpin during loading.

Accordingly, it is an object of this invention to provide a method of connecting a trailer to a truck with a self-lubricating washer between the two.

It is a further object of this invention to provide an article of manufacture which, when used in combination with a lubricating washer for a fifth wheel trailer-truck connection, will facilitate loading of the trailer to the truck.

It is a still further object of this invention to provide a self-locking retaining ring to hold a lubricating washer in fixed relationship on a trailer kingpin.

Other aspects, objects, and the several advantages of this invention are apparent from a study of this disclosure, the drawings, and the appended claims.

According to the invention, there is provided an article for retaining a lubricating washer in fixed relationship on a trailer kingpin so that the trailer can be attached to a truck with the lubricating ring attached therebetween. More specifically, the retaining ring is composed of a deformable or highly resilient material which can be annularly shaped, with the inner diameter of the ring being smaller than the diameter of the kingpin. In a more specific embodiment of the invention, the annular retaining ring fits into a recessed portion of the lubricating ring making an integral washer-retaining ring assembly.

Figure 2:
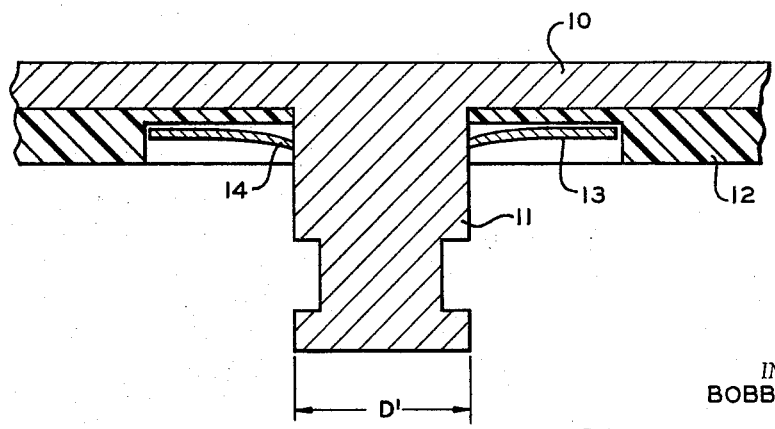

The invention can be more fully understood by reference to the drawings. FIGURE 1 shows the retaining ring. FIGURE 2 shows a cross section of the retaining ring, lubricating washer, and a kingpin on a trailer.

Referring to the drawings, 1 represents the self-locking retainer ring. The inner circumference of ring 1 is represented by 2. The ring 1 has radial slits 3 extending from the inner diameter 2, forming tongue-like projections.

In FIGURE 2, 10 represents the trailer body with kingpin 11 attached thereto. A lubricating washer 12 is attached to the kingpin and held in place by retaining ring 13 which fits into a recessed portion in lubricating washer 12. The ring fits loosely in the recess so that the lubricating washer is free to rotate. The inner diameter D of the retaining ring is smaller than the diameter D' of the kingpin. Thus, when retaining ring 1 is applied to kingpin 11, the inner diameter is deformed, forming tongues 14 which frictionally engage the kingpin 11, holding washer 12 and retaining ring 1 in locked position on kingpin 11.

Washer 12 may be any material which provides lubricating properties. A self-lubricating material, such as polyethylene or polypropylene, is preferred in the invention. However, other materials which have similar properties can be used.

The retaining ring must be deformable or highly resilient so that the self-locking tongues can be formed when the ring is attached to the kingpin. In addition, it must be strong enough to support the weight of the lubricating washer. In a preferred embodiment of the invention, a metal, such as high carbon steel, is used. In such a case, the tongues are relatively long and flex at their base.

In another preferred embodiment of the invention, the ends of the tongues are square to facilitate gripping of the kingpin.

There was designed and used a retainer ring which had the following dimensions:

| | Inches |
|---|---|
| Length of tongues | 7/16 |
| Inner diameter (D) | 2.860 |
| Diameter of kingpin (D') | 2.875 |
| Space between tongues | 1/8 |
| Outer diameter | 4.875 |

Reasonable variation and modification are permissible within the scope of the foregoing disclosure, the drawings, and the appended claims, the essence of which is that a self-locking, annular, retaining ring having an inner diameter smaller than the diameter of a trailer kingpin is used to hold a self-lubricating washer on a kingpin of a trailer which can be connected to a truck using a fifth wheel assembly.

I claim:
1. A retainer ring for holding a lubricating disc onto a kingpin used on a trailer fifth wheel assembly, said ring comprising an annular metal ring having an inner diameter smaller than that of said kingpin and at least two radial slits extending from the inner circumference a portion of the radius from said inner circumference to outer circumference so that the inner circumference will be easily enlarged when said retaining ring is attached to said kingpin.

2. In combination with a fifth wheel connecting a tractor and trailer, a kingpin on said trailer, a solid detachable lubricating disc on said kingpin, said solid lubricating disc having a recessed annular portion on one side thereof, an annular retainer ring underneath said detachable lubricating disc, said annular ring adapted to fit into said recessed portion of said detachable lubricating disc, said annular ring having an inner diameter less than the diameter of said kingpins so that said annular ring is held in frictional, locked engagement with said kingpin thereby holding said lubricating ring to said kingpin.

3. A combination according to claim 2 wherein said detachable solid lubricating disc is made from a material selected from the group consisting of polyethylene and polypropylene.

References Cited by the Examiner

UNITED STATES PATENTS

| 2,219,415 | 10/1940 | Fontaine | 280—434 |
| 2,514,034 | 7/1950 | Dean | 308—137 X |
| 2,815,253 | 2/1957 | Spriggs | 308—238 |
| 2,878,047 | 3/1957 | Booth | 280—433 |
| 2,918,302 | 12/1959 | Hartenstine | 280—433 |
| 2,944,831 | 7/1960 | Thomas | 280—96.1 |

LEO FRIAGLIA, *Primary Examiner.*

Disclaimer 3,275,390.—*Bobby G. Franks*, Bartlesville, Okla. RETAINER RING AND WASHER FOR TRACTOR-TRAILER WITH FIFTH WHEEL. Patent dated Sept. 27, 1966. Disclaimer filed Dec. 12, 1980, by the assignee, *Phillips Petroleum Company*.

Hereby enters this disclaimer to claim 1 of said patent.

[*Official Gazette March 3, 1981.*]